(12) United States Patent
Shirai

(10) Patent No.: US 10,662,110 B2
(45) Date of Patent: May 26, 2020

(54) ASPHALT COMPOSITION FOR PAVING ROADS

(71) Applicant: KAO CORPORATION, Tokyo (JP)

(72) Inventor: Eiji Shirai, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/099,011

(22) PCT Filed: Jan. 16, 2017

(86) PCT No.: PCT/JP2017/001264
§ 371 (c)(1),
(2) Date: Nov. 5, 2018

(87) PCT Pub. No.: WO2018/003151
PCT Pub. Date: Jan. 4, 2018

(65) Prior Publication Data
US 2019/0135693 A1    May 9, 2019

(30) Foreign Application Priority Data

Jun. 27, 2016 (JP) .................................. 2016-126628
Jan. 16, 2017 (JP) .................................. 2017-005111

(51) Int. Cl.
| | |
|---|---|
| C04B 26/26 | (2006.01) |
| C04B 24/28 | (2006.01) |
| C04B 18/02 | (2006.01) |
| C08L 95/00 | (2006.01) |
| C08G 63/676 | (2006.01) |
| E01C 7/26 | (2006.01) |
| E01C 19/18 | (2006.01) |
| C04B 111/00 | (2006.01) |

(52) U.S. Cl.
CPC .............. *C04B 26/26* (2013.01); *C04B 18/02* (2013.01); *C04B 24/283* (2013.01); *C08G 63/676* (2013.01); *C08L 95/00* (2013.01); *E01C 7/265* (2013.01); *E01C 19/18* (2013.01); C04B 2111/0075 (2013.01); C04B 2201/50 (2013.01); C08L 2555/22 (2013.01); C08L 2555/52 (2013.01); C08L 2555/80 (2013.01)

(58) Field of Classification Search
CPC ............................... C08L 95/00; C08L 67/025
See application file for complete search history.

(56) References Cited

U.S. PATENT DOCUMENTS

| | | |
|---|---|---|
| 8,709,693 B2 | 4/2014 | Yamasaki et al. |
| 2007/0281235 A1 | 12/2007 | Ono et al. |

FOREIGN PATENT DOCUMENTS

| | | |
|---|---|---|
| JP | 54-69136 A | 6/1979 |
| JP | 4-8766 A | 1/1992 |
| JP | 4-320453 A | 11/1992 |
| JP | 11-124498 A | 5/1999 |
| JP | 2005-126998 A | 5/2005 |
| JP | 2009-175755 A | 8/2009 |
| JP | 2009-286871 A | 12/2009 |
| JP | 2013-222044 A | 10/2013 |
| WO | WO-2017125421 A1 * | 7/2017 ............. C08L 95/00 |

OTHER PUBLICATIONS

International Search Report (PCT/ISA/210) issued in PCT/JP2017/001264, dated Feb. 7, 2017.
Extended European Search Report dated Nov. 7, 2019, for corresponding European Patent Application No. 17819521.0.

* cited by examiner

*Primary Examiner* — Wenwen Cai
(74) *Attorney, Agent, or Firm* — Birch, Stewart, Kolasch & Birch, LLP

(57) ABSTRACT

Asphalt composition for road pavement, which is excellent in drying strength, strength after immersion in water, and bending strength, a method for producing the same, and a road paving method. The asphalt composition includes asphalt, a polyester resin, and an aggregate. The polyester resin is a specific polyester, and the amount of the polyester resin ranges from 2 through 30 parts by mass, based on 100 parts by mass of asphalt. The method for producing an asphalt composition for road pavement, includes a step of mixing asphalt, the polyester resin, and an aggregate at 130° C. or higher and 200° C. or lower, wherein the polyester resin is used in an amount ranging from 2 through 30 parts by mass, based on 100 parts by mass of the asphalt. The road paving method including a step of laying the asphalt composition, thereby forming an asphalt paving material layer.

7 Claims, No Drawings

ASPHALT COMPOSITION FOR PAVING ROADS

FIELD OF THE INVENTION

The present invention relates to an asphalt composition for road pavement, a method for producing the same, and a road paving method.

BACKGROUND OF THE INVENTION

Asphalt pavement using an asphalt composition has been performed for paving driveways, parking spaces, cargo yards, sidewalks, etc., because of relatively easy construction and a short period of time from beginning of paving works to traffic start.

The asphalt pavement includes a road surface which is formed of an asphalt composition containing aggregates bonded with each other through asphalt, and hence, paved roads exhibit good hardness and good durability.

However, since asphalt is a petroleum refined product, it has such properties that it is apt to be dissolved in similar petroleum refined products, such as gasoline, light oils, heavy oils, kerosene, and engine lubricants. For this reason, if fuels or lubricants leak on the road surface from vehicles, etc., the asphalt tends to be dissolved in the fuels or lubricants, which will lead to erosion of the asphalt composition and occurrence of pavement destruction, such as formation of pot holes. Therefore, in such a case, repair of the pavement is inevitably needed, which results in increased maintenance costs and significant influence on car traffic.

PTL 1 describes a composition for road pavement, which is used for constructing a surface layer (topcoat layer) of a paving body. Here, as a composition for road pavement having sufficient strength and capable of revealing the strength at an early stage and making it possible to efficiently form or repair a paving body, PTL 1 describes a composition for road pavement containing a water dispersion resulting from neutralizing a resin (A) having an acid value of 3 to 100 KOHmg/g with a basic compound, and a silane coupling agent having an alkoxy group having 1 to 5 carbon atoms and an amino group, the composition constituting a binder for an aggregate in the road pavement or a surface layer of a paving body.

PTL 2 describes an asphalt roofing sheet to be laid as a waterproof sheet, etc., for roofs of buildings, etc. Here, as a nonwoven fabric capable of satisfying heat-resistant morphological properties, strength, elongation, and water resistance, an aqueous resin composition for impregnating the nonwoven fabric, and an asphalt roofing sheet using the same, PTL 2 discloses an aqueous resin composition for impregnating a nonwoven fabric, which contains (A) a prescribed polyurethane resin, (B) a water-soluble polymer having an OH group, and (C) a prescribed crosslinking agent, the composition satisfying a value of (A)/(B) (weight ratio) of 1/99 to 20/80 and a value of ((A)+(B))/(C) (weight ratio) of 99.9/0.1 to 70/30, and an asphalt roofing sheet having asphalt impregnated in the nonwoven fabric.

As an asphalt composition suitable for road pavement, which is capable of being laid even at low temperatures and preventing the rut of a wheel of a running vehicle on a road which is stable even at high temperatures, PTL 3 describes an asphalt composition containing asphalt and a polyester-based polymer.

CITATION LIST

Patent Literature

PTL 1: JP 2005-126998A
PTL 2: JP 11-124498A
PTL 3: JP 04-008766A

SUMMARY OF THE INVENTION

The present invention relates to the following [1] to [3].
[1] An asphalt composition for road pavement, including:
   asphalt;
   a polyester resin; and
   an aggregate,
   wherein the polyester resin is (i) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid and maleic acid, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, or (ii) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid, maleic acid, terephthalic acid and isophthalic acid, and having a total amount of fumaric acid and maleic acid of less than 50 mol %, and a total amount of terephthalic acid and isophthalic acid of less than 50 mol %, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, and
   the ratio of the polyester resin is 2 parts by mass or more and 30 parts by mass or less based on 100 parts by mass of the asphalt.
[2] A method for producing an asphalt composition for road pavement, including:
   a step of mixing asphalt, a polyester resin, and an aggregate at 130° C. or higher and 200° C. or lower,
   wherein the polyester resin is (i) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid and maleic acid, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, or (ii) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid, maleic acid, terephthalic acid and isophthalic acid, and having a total amount of fumaric acid and maleic acid of less than 50 mol %, and a total amount of terephthalic acid and isophthalic acid of less than 50 mol %, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, and the ratio of the polyester resin is 2 parts by mass or more and 30 parts by mass or less based on 100 parts by mass of the asphalt.

[3] A road paving method including a step of laying an asphalt composition obtained by the method as set forth above in [2], thereby forming an asphalt paving material layer.

DETAILED DESCRIPTION OF THE INVENTION

Such an asphalt composition that even in a rainy weather or even when immersed in the leaked gasoline or oil, it keeps high strength and is hardly rutted has been required.

Now, the present invention relates to an asphalt composition for road pavement, which is excellent in dry strength, strength after immersion in water, and bending strength, a method for producing the same, and a road paving method using the same.

The present invention relates to the following [1] to [3].

[1] An asphalt composition for road pavement, including:
asphalt;
a polyester resin; and
an aggregate,
wherein the polyester resin is (i) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid and maleic acid, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, or (ii) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid, maleic acid, terephthalic acid and isophthalic acid, and having a total amount of fumaric acid and maleic acid of less than 50 mol %, and a total amount of terephthalic acid and isophthalic acid of less than 50 mol %, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, and the ratio of the polyester resin is 2 parts by mass or more and 30 parts by mass or less based on 100 parts by mass of the asphalt.

[2] A method for producing an asphalt composition for road pavement, including:
a step of mixing asphalt, a polyester resin, and an aggregate at 130° C. or higher and 200° C. or lower,
wherein the polyester resin is (i) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid and maleic acid, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, or (ii) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid, maleic acid, terephthalic acid and isophthalic acid, and having a total amount of fumaric acid and maleic acid of less than 50 mol %, and a total amount of terephthalic acid and isophthalic acid of less than 50 mol %, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, and the ratio of the polyester resin is 2 parts by mass or more and 30 parts by mass or less based on 100 parts by mass of the asphalt.

[3] A road paving method including a step of laying an asphalt composition obtained by the method as set forth above in [2], thereby forming an asphalt paving material layer.

According to the present invention, it is possible to provide an asphalt composition for road pavement, which is excellent in dry strength, strength after immersion in water, and bending strength, a method for producing the same, and a road paving method using the same.

[Asphalt Composition for Road Pavement]

The asphalt composition for road pavement of the present invention contains asphalt, a polyester resin, and an aggregate.

The polyester resin is (i) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid and maleic acid, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, or (ii) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid, maleic acid, terephthalic acid and isophthalic acid, and having a total amount of fumaric acid and maleic acid of less than 50 mol %, and a total amount of terephthalic acid and isophthalic acid of less than 50 mol %, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less.

The ratio of the polyester resin is 2 parts by mass or more and 30 parts by mass or less based on 100 parts by mass of the asphalt.

The above-mentioned polyester (i) is referred to as "polyester (i)", and the polyester (ii) is as "polyester (ii)".

According to the asphalt composition for road pavement of the present invention, the dry strength, the strength after immersion in water, and bending the strength are excellent. Though reasons for that are not always elucidated yet, the following may be considered.

It may be considered that in view of the fact that the polyester resin is contained in the asphalt composition for road pavement, the polyester resin is melted and dispersed in the asphalt, and when contacted with the aggregate, the asphalt composition covers the surfaces of the aggregate and increases the adhesive strength among the aggregate to each other, thereby increasing the strength at a normal time; meanwhile, even when the asphalt is dissolved in gasoline, etc., an effect for keeping the strength through adhesion with the polyester resin is obtained.

In addition, it may be considered that by using the polyester having a softening point and a glass transition point each falling within a prescribed range and also having a prescribed structure, the polyester in the asphalt composition is apt to be dissolved or dispersed in the asphalt at the time of laying.

Meanwhile, it may be considered that by containing the polyester having an acid value falling within a prescribed range, after laying, the polyester exhibits high adsorptivity to the aggregate, and the hydrogen bond gets strong, whereby the adhesive strength is also improved.

[Asphalt]

As the asphalt which is used in the present invention, for example, various kinds of asphalts may be used. Examples thereof include straight asphalt that is petroleum asphalt for pavement, as well as modified asphalts.

The straight asphalt as referred to herein refers to a residual bituminous material obtained by applying a crude oil to an atmospheric distillation apparatus, a vacuum distillation apparatus, etc.

Examples of the modified asphalts include blown asphalts, and asphalts modified with a polymer material, such as a thermoplastic elastomer and a thermoplastic resin.

Examples of the thermoplastic elastomer include a styrene/butadiene/block copolymer (SBS), a styrene/isoprene/block copolymer (SIS), and an ethylene/vinyl acetate copolymer (EVA).

Examples of the thermoplastic resin include an ethylene/vinyl acetate copolymer, an ethylene/ethyl acrylate copolymer, polyethylene, and polypropylene.

Of these, straight asphalt is preferred.

A needle penetration of the asphalt or straight asphalt is preferably 120 or less, more preferably 80 or less, even more preferably 60 or less, and is preferably 20 or more, more preferably 30 or more, even more preferably 40 or more. A measurement method of the needle penetration conforms to the method standardized in JIS K2207. It is to be noted that a length of 0.1 mm when a prescribed needle penetrates vertically into a sample under test conditions prescribed in JIS K2207 is expressed as 1.

A content of the asphalt in the asphalt composition is preferably 2% by mass or more, and more preferably 3% by mass or more, and it is preferably 15% by mass or less, more preferably 10% by mass or less, and still more preferably 8% by mass or less.

[Polyester Resin]

The polyester resin is a polyester containing an alcohol component-derived constituent unit and a carboxylic acid component-derived constituent unit.

Hereinunder, the constitutions common to the polyester (i) and the polyester (ii) are described.

In the polyester, the alcohol component-derived constituent unit as referred to herein means a structure resulting from eliminating a hydrogen atom from the hydroxy group of the alcohol component; and the carboxylic acid component-derived constituent unit as referred to herein means a structure resulting from eliminating a hydroxy group from the carboxy group of the carboxylic acid component.

<Alcohol Component>

Examples of the alcohol component include aliphatic diols, aromatic diols, and trihydric or more polyhydric alcohols. These alcohol components may be used alone or in combination with two or more kinds thereof.

From the viewpoint of exhibiting excellent dry strength, the alcohol component contains an alkylene oxide adduct of bisphenol A, and preferably contains an alkylene oxide adduct of bisphenol A represented by the following formula (I):

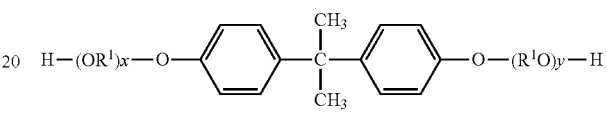

wherein each of $OR^1$ and $R^1O$ represents an alkylene oxide; $R^1$ represents an alkylene group having 2 or 3 carbon atoms; each of x and y represents a positive number expressing an average addition molar number of the alkylene oxide; and a sum total of x and y is 1 or more, and preferably 1.5 or more, and it is 16 or less, preferably 8 or less, and more preferably 4 or less.

Examples of the alkylene oxide adduct of bisphenol A represented by the foregoing formula (I) include a propylene oxide adduct of 2,2-bis(4-hydroxyphenyl)propane and an ethylene oxide adduct of 2,2-bis(4-hydroxyphenyl)propane. Of these, a combination of a propylene oxide adduct of 2,2-bis(4-hydroxyphenyl)propane and an ethylene oxide adduct of 2,2-bis(4-hydroxyphenyl)propane is preferred.

In the alcohol component, the amount of the alkylene oxide adduct of bisphenol A is, from the viewpoints of increasing melt-dispersibility in the asphalt and attaining excellent dry strength, 65 mol % or more, more preferably 70 mol % or more, still more preferably 80 mol % or more, yet still more preferably 90 mol % or more, and it is 100 mol % or less, preferably 98 mol % or less, more preferably 95 mol % or less.

The molar ratio of the propylene oxide adduct of bisphenol A to the ethylene oxide adduct of bisphenol A is preferably 0/100 or more, more preferably 1/99 or more, even more preferably 3/97, and is, from the viewpoint of improving more the melt dispersibility in asphalt and attaining a more excellent dry strength, and from the viewpoint of improving the bending strength, preferably 50/50 or less, more preferably 40/60 or less, even more preferably 30/70 or less, still more preferably 20/80 or less, yet still more preferably 10/90 or less, and further more preferably 7/93 or less.

The aliphatic diol is preferably an aliphatic diol having 2 or more and 20 or less carbon atoms. The aliphatic diol includes ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol, and 1,12-dodecanediol.

In the case where an aliphatic diol is contained, the amount of the aliphatic diol in the alcohol component is, from the viewpoint of improving melt dispersibility in asphalt and attaining excellent dry strength, preferably 1 mol % or more, more preferably 3 mol % or more, even more preferably 5 mol % or more, and it is preferably 30 mol % or less, more preferably 15 mol % or less, even more preferably 10 mol % or less.

The trihydric or more polyhydric alcohol is preferably a trihydric alcohol. The trihydric or more polyhydric alcohol includes glycerin.

In the case where a trihydric or more polyhydric alcohol is contained, the amount of the trihydric or more polyhydric alcohol in the alcohol component is, from the viewpoint of improving melt dispersibility in asphalt and attaining excellent dry strength, preferably 1 mol % or more, more preferably 3 mol % or more, even more preferably 5 mol % or more, and it is preferably 30 mol % or less, more preferably 15 mol % or less, even more preferably 10 mol % or less.

<Carboxylic Acid Component>

In the polyester (i), the carboxylic acid component contains, from the viewpoint of attaining excellent dry strength, strength after immersion in water and bending strength, one or more selected from fumaric acid and maleic acid, and from the viewpoint of synergistically improving the effects, preferably contains fumaric acid and maleic acid.

In the carboxylic acid component, the total amount of one or more selected from fumaric acid and maleic acid is, from the viewpoint of attaining excellent dry strength, strength after immersion in water and bending strength, 50 mol % or more, preferably 60 mol % or more, more preferably 80 mol % or more, and it is 100 mol % or less, and preferably 100 mol %.

In the polyester (ii), the carboxylic acid component contains, from the viewpoint of attaining excellent dry strength, strength after immersion in water and bending strength, one or more selected from the group consisting of fumaric acid, maleic acid, terephthalic acid and isophthalic acid in a total amount of 50 mol % or more.

The carboxylic acid component is, from the viewpoint of dry strength, strength after immersion in water and bending strength, preferably a combination of one or more selected from the group consisting of fumaric acid and maleic acid, and one or more selected from the group consisting of terephthalic acid and isophthalic acid, and is more preferably a combination of fumaric acid and terephthalic acid.

In the carboxylic acid component, the total amount of one or more selected from fumaric acid, maleic acid, terephthalic acid and isophthalic acid is, from the viewpoint of attaining excellent dry strength, strength after immersion in water and bending strength, 50 mol % or more, preferably 60% or more, more preferably 80 mol % or more, and it is 100 mol % or less, preferably 98 mol % or less, more preferably 95 mol % or less.

The common subject matters for the polyester (i) and the polyester (ii) are described below.

Examples of other carboxylic acid components include aliphatic dicarboxylic acids other than fumaric acid and maleic acid (hereinafter also referred to as "other aliphatic dicarboxylic acids"), aromatic dicarboxylic acids, tri or more polycarboxylic acids, and acid anhydrides and alkyl (with 1 or more and 3 or less carbon atoms) esters thereof. These carboxylic acid components may be used alone or in combination of two or more kinds thereof.

From the viewpoint of more improving the dry strength, the carbon number of the main chain of the other aliphatic dicarboxylic acid is preferably 4 or more, and it is preferably 10 or less, more preferably 8 or less, and still more preferably 6 or less.

Specific examples thereof include oxalic acid, malonic acid, citraconic acid, itaconic acid, glutaconic acid, succinic acid, adipic acid, suberic acid, azelaic acid, sebacic acid, and dodecane diacid. In addition, examples of the aliphatic dicarboxylic acid also include succinic acids substituted with an alkyl group having 1 or more and 20 or less carbon atoms or an alkenyl group having 2 or more and 20 or less carbon atoms, such as dodecylsuccinic acid, dodecenylsuccinic acid, and octenylsuccinic acid.

Examples of the aromatic dicarboxylic acid include terephthalic acid, phthalic acid, and isophthalic acid. Among these, terephthalic acid or isophthalic acid is preferred, and isophthalic acid is more preferred.

In the case where the other dicarboxylic acid is contained in the carboxylic acid component that is a raw material monomer of the polyester resin, from the viewpoint of more improving the dry strength, a content of the other dicarboxylic acid is preferably 0.1 mol % or more, more preferably 1 mol % or more, and still more preferably 5 mol % or more, and it is preferably 50 mol % or less, more preferably 40 mol % or less, and still more preferably 20 mol % or less.

The tri or more polycarboxylic acid is preferably a tricarboxylic acid.

Examples of the tri or more polycarboxylic acid include trimellitic acid, 2,5,7-naphthalenetricarboxylic acid and pyromellitic acid, or acid anhydrides thereof. From the viewpoint of more improving the dry strength, trimellitic acid or acid anhydride thereof is preferred.

In the case where a polycarboxylic acid is contained, the content of the tri or more polycarboxylic acid in the carboxylic acid component is, from the viewpoint of more improving the dry strength, preferably 1 mol % or more, more preferably 3 mol % or more, and still more preferably 5 mol % or more, and it is preferably 30 mol % or less, more preferably 20 mol % or less, and still more preferably 10 mol % or less.

[Molar Ratio of Carboxylic Acid Component-Derived Constituent Unit to Alcohol Component-Derived Constituent Unit]

From the viewpoint of controlling the acid value, a molar ratio of the carboxylic acid component-derived constituent unit to the alcohol component-derived constituent unit [(carboxylic acid component)/(alcohol component)] is preferably 0.7 or more, and more preferably 0.8 or more, and it is preferably 1.5 or less, more preferably 1.3 or less, still more preferably 1.1 or less, and yet still more preferably less than 1.0.

The proportion of the dialcohol-derived constituent component and the dicarboxylic acid-derived constituent component in the polyester resin is, from the viewpoints of increasing the dispersibility and increasing the dry strength, preferably 90 mol % or more, more preferably 95 mol % or more, and it is 100 mol % or less, preferably 98 mol % or less.

It is to be noted that from viewpoint of controlling properties, a monoalcohol may be properly contained in the alcohol component, and a monocarboxylic acid compound may be properly contained in the carboxylic acid component.

[Properties of Polyester Resin]

The acid value of the polyester resin is preferably 2 mgKOH/g or more, more preferably 3 mgKOH/g or more, and still more preferably 5 mgKOH/g or more, and it is preferably 30 mgKOH/g or less, more preferably 20 mgKOH/g or less, even more preferably 15 mgKOH/g or less, and still more preferably 10 mgKOH/g or less.

The hydroxy group value of the polyester resin is preferably 10 mgKOH/g or more from the viewpoints of exhibiting high adhesive strength to the aggregate and improving the dry strength, more preferably 15 mgKOH/g or more, even more preferably 20 mgKOH/g or more, still more preferably 25 mgKOH/g or more, and it is, from the viewpoint of improving the dry strength and the strength after immersion in water, preferably 50 mgKOH/g or less, more preferably 45 mgKOH/g or less, even more preferably 40 mgKOH/g or less.

The softening point of the polyester resin is 90° C. or higher, and preferably 95° C. or higher, more preferably 97.5° C. or higher, even more preferably 100° C. or higher from the viewpoints of exhibiting high adhesive strength to aggregate and improving the dry strength, and it is 125° C. or lower, preferably 120° C. or lower, more preferably 115° C. or lower from the viewpoint of attaining excellent melt-dispersibility in asphalt and improving the dry strength.

The glass transition point of the polyester resin is 40° C. or higher, and preferably 45° C. or higher, more preferably 50° C. or higher from the viewpoint of improving the dry strength, and it is 70° C. or lower, and preferably 60° C. or lower, more preferably 55° C. or lower from the viewpoint of improving the dry strength.

The number average molecular weight of the polyester resin is, from the viewpoint of exhibiting high adhesive strength to aggregate and improving the dry strength, 3,000 or more, more preferably 3,500 or more, still more preferably 4,000 or more, and it is 8,000 or less, preferably 7,000 or less, more preferably 5,000 or less.

The acid value, the hydroxy group value, the softening point, the glass transition point and the number average molecular weight may be measured according to the methods described in the section of Examples.

It is to be noted that the acid value, the hydroxy group value, the softening point, and the glass transition point may be controlled by a raw material monomer composition, a molecular weight, a catalyst amount, or reaction conditions.

In addition, the polyester resin may be used alone or in combination of two or more kinds thereof. In the case of jointly using two or more kinds of the polyester resins, the softening point is a value of the mixture as determined by the method in Examples.

[Production Method for Polyester Resin]

Although a method for producing the polyester resin is not particularly limited, for example, the polyester resin may be produced by subjecting the alcohol component and the carboxylic acid component as described above to polycondensation.

A blending amount of each of the alcohol component and the carboxylic acid component is a blending amount such that the molar ratio of the carboxylic acid component-derived constituent unit to the alcohol component-derived constituent unit [(carboxylic acid component)/(alcohol component)] falls with the foregoing numerical value range.

That is, as for the method for producing the polyester resin, the polyester resin may be, for example, produced by subjecting the alcohol component and the carboxylic acid component as described above to polycondensation in a blending amount such that the molar ratio of the carboxylic acid component-derived constituent unit to the alcohol component-derived constituent unit [(carboxylic acid component)/(alcohol component)] falls within the foregoing numerical value range.

From the viewpoint of reactivity, a temperature of the polycondensation reaction is preferably 160° C. or higher, more preferably 190° C. or higher, and still more preferably 200° C. or higher, and it is preferably 260° C. or lower, more preferably 250° C. or lower, and still more preferably 240° C. or lower.

Examples of an esterification catalyst which is used for the polycondensation reaction include titanium compounds and tin(II) compounds not having an Sn—C bond. These may be used alone or in combination of two or more kinds thereof.

As the titanium compound, titanium compounds having a Ti—O bond are preferred, and titanium compounds having an alkoxy group, an alkenyloxy group, or an acyloxy group, each having a total carbon number of 1 or more and 28 or less, are more preferred.

As the tin(II) compound not having an Sn—C bond, tin(II) compounds having an Sn—O bond and tin(II) compounds having an Sn—X (X represents a halogen atom) bond are preferably exemplified, with tin(II) compounds having an Sn—O bond being more preferred. Above all, tin(II) di(2-ethylhexanoate) is more preferred from the viewpoints of reactivity, control of molecular weight, and control of properties of composite resin.

From the viewpoint of reactivity, a use amount of the esterification catalyst is preferably 0.01 parts by mass or more, more preferably 0.1 parts by mass or more, and still more preferably 0.2 parts by mass or more, and it is preferably 1.5 parts by mass or less, more preferably 1.0 part by mass or less, and still more preferably 0.6 parts by mass or less, based on 100 parts by mass of a total amount of the alcohol component and the carboxylic acid component.

As an esterification cocatalyst, pyrogallol compounds are preferred. Such a pyrogallol compound is a compound having a benzene ring in which three hydrogen atoms adjacent to each other are substituted with a hydroxy group, and examples thereof include pyrogallol, gallic acid, gallic acid esters, benzophenone derivatives, such as 2,3,4-trihydroxybenzophenone and 2,2',3,4-tetrahydroxybenzophenone, and catechin derivatives, such as epigallocatechin and epigallocatechin gallate. From the viewpoint of reactivity, gallic acid is preferred.

From the viewpoint of reactivity, the amount to be used of the esterification cocatalyst is preferably 0.001 parts by mass or more, more preferably 0.005 parts by mass or more, and still more preferably 0.01 parts by mass or more, and it is preferably 0.15 parts by mass or less, more preferably 0.10 parts by mass or less, and still more preferably 0.05 parts by mass or less, based on 100 parts by mass of a total amount of the alcohol component and the carboxylic acid component.

[Ratio of Polyester Resin]

From the viewpoint of improving the dry strength, the ratio of the polyester resin is 2 parts by mass or more, preferably 5 parts by mass or more, more preferably 8 parts by mass or more, even more preferably 10 parts by mass or more, further more preferably 15 parts by mass or more, and it is 30 parts by mass or less, preferably 25 parts by mass or less, based on 100 parts by mass of asphalt.

[Average Particle Diameter of Polyester Resin]

The polyester resin is preferably a polyester resin particle.

An average particle diameter of the polyester resin particle is preferably 200 μm or more, more preferably 400 μm or more, and still more preferably 600 μm or more from the viewpoints of increasing the dispersibility of the resin and improving the dry strength; and it is preferably 1,700 μm or less, more preferably 1,500 μm or less, and still more preferably 1,200 μm or less from the viewpoints of increasing the dispersibility of the resin and improving the dry strength.

It is to be noted that the average particle diameter is a value measured in conformity with the prescription of JIS Z8815. Specifically, a sample is sieved with seven sieves having a sieve opening of 2,830 μm, 2,000 μm, 1,400 μm, 850 μm, 600 μm, 425 μm, and 106 μm, respectively. The average particle diameter is the weighted average of the particle diameter being calculated by the weights of the remained samples in the sieves, as the samples having a diameter of the sieve opening.

The polyester resin particle is obtained by pulverizing the polyester resin or dispersing the polyester resin in an aqueous solvent. Above all, it is preferred to obtain the polyester resin particle through pulverization. Examples of commercially available products of a pulverizer which is used for the pulverization include "SF-1", manufactured by Sanriki Seisakusho Co., Ltd.

[Aggregate]

The asphalt composition of the present invention contains an aggregate.

The aggregate may be, for example, optionally selected from crushed stone, cobble stone, gravel, sand, reclaimed aggregate, and ceramics, and used.

As the aggregate, all of a coarse aggregate having a particle diameter of 2.36 mm or more and a fine aggregate having a particle diameter of less than 2.36 mm may be used. Examples of the coarse aggregate include No. 7 crushed stone having particle diameter range of 2.36 mm or more and 4.75 mm or less, No. 6 crushed stone having particle diameter range of 4.75 mm or more and 13.2 mm or less, No. 5 crushed stone having particle diameter range of 13.2 mm or more and 19 mm or less, and No. 4 crushed stone having particle diameter range of 19 mm or more and 31.5 mm or less.

The fine aggregate is preferably a fine aggregate having particle diameter of 0.075 mm or more and less than 2.36 mm.

Examples of the fine aggregate include river sand, hill sand, mountain sand, sea sand, crushed sand, fine sand, screenings, crushed stone dust, silica sand, artificial sand, glass cullet, molding sand, and recycled aggregate-crushed sand.

The particle diameter is a value defined in JIS 5001-1995.

Of these, a combination of coarse aggregate and fine aggregate is preferred.

The fine aggregate may include a filler having a particle diameter of less than 0.075 mm (for example, sand). The lower limit of the average particle diameter of the filler is, for example, 0.001 mm or more.

The average particle diameter of the filler is preferably 0.001 mm or more from the viewpoints of improving the dry strength; and it is preferably 0.05 mm or less, more preferably 0.03 mm or less, and still more preferably 0.02 mm or less from the viewpoints of the same. The average particle diameter of the filler can be measured by laser diffraction particle size analyzers. Here, the average particle diameter means an average particle diameter of 50% cumulative volume.

[Measurement Method for Average Particle Diameter of Filler]

The average particle diameter of the filler is a value measured by a laser diffraction particle size analyzer (LA-950, manufactured by HORIBA, Ltd.) with following condition.

Measurement Method: Flow method
Dispersion Media: Ethanol
Sample Preparation: 2 mg/100 mL
Dispersing method: Stirring with built-in ultrasonic waves for 1 minute Examples of the filler include sand, fly ash, calcium carbonate and hydrated lime. Of these, calcium carbonate is preferable from the viewpoints of improving the dry strength.

The mass ratio of the coarse aggregate to the fine aggregate is preferably 10/90 or more, more preferably 20/80 or more, and still more preferably 30/70 or more, and it is preferably 90/10 or less, more preferably 80/20 or less, and still more preferably 70/30 or less.

The content of the aggregate is preferably 1,000 parts by mass or more, more preferably 1,200 parts by mass or more, and still more preferably 1,500 parts by mass or more, and it is preferably 3,000 parts by mass or less, more preferably 2,500 parts by mass or less, and still more preferably 2,000 parts by mass or less, based on 100 parts by mass of the total amount of asphalt and polyester resin.

Suitable blending examples of the asphalt composition of the present invention are as follows.

(1) An example of the asphalt composition includes, for example, 30% by volume or more and less than 45% by volume of the coarse aggregate, 30% by volume or more and 50% by volume or less of the fine aggregate, and 5% by volume or more and 10% by volume or less of the asphalt and the polyester resin (fine-graded asphalt).

(2) An example of the asphalt composition includes, for example, 45% by volume or more and less than 70% by volume of the coarse aggregate, 20% by volume or more and 45% by volume or less of the fine aggregate, and 3% by volume or more and 10% by volume or less of the asphalt and the polyester resin (dense-graded asphalt).

(3) An example of the asphalt composition includes, for example, 70% by volume or more and 80% by volume or less of the coarse aggregate, 10% by volume or more and 20% by volume or less of the fine aggregate, and 3% by volume or more and 10% by volume or less of the asphalt and the polyester resin (porous asphalt).

In the present invention, other components may be further blended, if desired.

It is to be noted that the blending ratio of asphalt in the conventional asphalt compositions containing an aggregate and the asphalt may be in general determined by referring to an optimum asphalt amount obtained from "Formulation and Design of Asphalt Mixture" as described in "Guideline for Pavement Design and Construction" published by Japan Road Association.

In the present invention, the above-described optimum asphalt amount corresponds to the total amount of the asphalt and the polyester resin. In consequence, in general, the total amount of the asphalt and the polyester resin blended in the asphalt composition is preferably determined from the above-described optimum asphalt amount.

However, the method of determining the amounts of the respective components in the asphalt composition is not particularly limited to the method as described in "Guideline for Pavement Design and Construction", and the amounts of the respective components in the asphalt composition may also be determined by any other methods.

[Production Method for Asphalt Composition]

The asphalt composition of the present invention may be used in the form of a heated asphalt composition not substantially containing water, or may also be used in the form of a cold asphalt mixture which is an asphalt emulsion prepared by blending the above-described asphalt composition with an emulsifier or water.

In particular, in the asphalt composition of the present invention, the polyester resin is apt to be uniformly dispersed in the asphalt composition. Therefore, when the asphalt composition of the present invention is used in the form of a heated asphalt composition, it is able to effectively exhibit its characteristic features.

In the case of using the asphalt composition of the present invention in the form of a heated asphalt composition, the method for producing the asphalt composition is not particularly limited, and the asphalt composition of the present invention may be produced by any methods. However, in general, the asphalt composition of the present invention may be produced according to any method for producing asphalt compositions containing an aggregate and asphalt.

The method for producing the asphalt composition of the present invention preferably includes a step of mixing asphalt, a polyester resin, and an aggregate at 130° C. or higher and 200° C. or lower (hereinafter also referred to as "Step 1").

The mixing temperature in Step 1 is preferably a temperature higher than the softening point of the polyester resin. Specifically, the mixing temperature in Step 1 is preferably 140° C. or higher, and it is preferably 190° C. or lower, and more preferably 180° C. or lower.

The mixing time in Step 1 is, for example 30 seconds or more, preferably 1 minute or more, more preferably 2 minutes or more, even more preferably 5 minutes or more. The upper limit of the time is not not particularly limited, and is, for example, about 30 minutes or so.

As the specific production method, there may be used the conventional method for production of asphalt compositions which is known as a so-called plant mix (premix) method in which, in the step of mixing an aggregate with asphalt, the polyester resin may be charged together with asphalt. However, in this case, in order to melt the polyester resin, it is preferred to previously make the temperature of the aggregate higher than that usually used.

In addition, asphalt and a polyester resin may be previously mixed while stirring at a high temperature, for example, 130° C. or higher (preferably 150° C. or higher), and then the resulting mixture may be charged (premix method).

As described above, in the method for producing the asphalt composition by blending a polyester resin, the polyester resin is exposed to a high temperature. As for the degree of the high temperature, it is required that the higher the blending proportion of the polyester resin, the higher the temperature is. In consequence, in the case where the blending proportion of a polyester resin is high, the temperature of the asphalt composition becomes higher, so that there is a concern that the polyester resin suffers from heat deterioration. Such a phenomenon tends to occur more frequently as the softening point of the polyester resin becomes higher.

In the present invention, the polyester resin used has a relatively low softening point, and preferably, the blending proportion of the polyester resin in the asphalt composition is reduced. Therefore, the asphalt composition of the present invention is capable of providing a good pavement which is free from any concern about heat deterioration.

[Road Paving Method]

The asphalt composition of the present invention is used for road pavement.

The road paving method of the present invention preferably includes a step of laying the asphalt composition of the present invention, thereby forming an asphalt paving material layer (hereinafter also referred to as "Step 2").

It is to be noted that in Step 2, the asphalt composition of the present invention may be subjected to compacting laying using the same formation of the laying machines as used for ordinary asphalt compositions. In the case of using the asphalt composition in the form of a heated asphalt composition, a compacting temperature thereof is preferably higher than the softening point of the polyester resin. The compacting temperature is preferably 100° C. or higher, more preferably 120° C. or higher, and still more preferably 130° C. or higher, and it is preferably 200° C. or lower, more preferably 180° C. or lower, and still more preferably 170° C. or lower.

With respect to the above-described embodiments, the present invention further discloses the following asphalt composition for road pavement and road paving method.

<1> An asphalt composition for road pavement, including asphalt, a polyester resin, and an aggregate, wherein the polyester resin is (i) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid and maleic acid, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, or (ii) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid, maleic acid, terephthalic acid and isophthalic acid, and having a total amount of fumaric acid and maleic acid of less than 50 mol %, and a total amount of terephthalic acid and isophthalic acid of less than 50 mol %, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, and the ratio of the polyester resin is 2 parts by mass or more and 30 parts by mass or less based on 100 parts by mass of the asphalt.

<2> The asphalt composition for road pavement according to <1>, wherein the alkylene oxide adduct of bisphenol A satisfies the relation that the molar ratio of polypropylene oxide adduct of bisphenol A/polyethylene oxide adduct of bisphenol A is preferably 0/100 or more, more preferably 1/99 or more, even more preferably 3/97 or more, and is preferably 50/50 or less, more preferably 40/60 or less, even more preferably 30/70 or less, still more preferably 20/80 or less, further more preferably 10/90 or less, especially further more preferably 7/93 or less.

<3> The asphalt composition for road pavement according to <1> or <2>, wherein the amount of the alkylene oxide adduct of bisphenol A in the alcohol component is 65 mol % or more, more preferably 70 mol % or more, more preferably 80 mol % or more, more preferably 90 mol % or more, and is 100 mol % or less, preferably 98 mol % or less, more preferably 95 mol % or less.

<4> The asphalt composition for road pavement according to any of <1> to <3>, wherein the alcohol component preferably further contains a tri or more polyalcohol, and the amount of the tri or more polyalcohol in the alcohol component is preferably 1 mol % or more, more preferably 3 mol % or more, more preferably 5 mol % or more, and is preferably 30 mol % or less, more preferably 15 mol % or less, more preferably 10 mol % or less.

<5> The asphalt composition for road pavement according to any of <1> to <4>, wherein the proportion of the dialcohol-derived constituent unit and the dicarboxylic acid-derived constituent unit in the polyester resin is 95 mol % or more.
<6> The asphalt composition for road pavement according to any of <1> to <5>, wherein the carboxylic acid component is preferably the polyester (i) and preferably contains fumaric acid and maleic acid.
<7> The asphalt composition for road pavement according to <6>, wherein the total amount of one or more selected from fumaric acid and maleic acid in the carboxylic acid component is 50 mol % or more, preferably 60 mol % or more, preferably 80 mol % or more, and more preferably 100 mol %, and is more preferably 100 mol %.
<8> The asphalt composition for road pavement according to any of <1> to <5>, wherein the carboxylic acid component is preferably the polyester (ii) and preferably contains one or more selected from the group consisting of fumaric acid and maleic acid and one or more selected from the group consisting of terephthalic acid and isophthalic acid, and more preferably contains fumaric acid and terephthalic acid.
<9> The asphalt composition for road pavement according to <8>, wherein the total amount of one or more selected from fumaric acid, maleic acid, terephthalic acid and isophthalic acid in the carboxylic acid component is 50 mol % or more, preferably 60 mol % or more, preferably 80 mol % or more, and is 100 mol % or less, preferably 98 mol % or less, more preferably 95 mol % or less.
<10> The asphalt composition for road pavement according to any of <1> to <9>, wherein the acid value of the polyester resin is 2 mgKOH/g or more, preferably 3 mgKOH/g or more, more preferably 5 mgKOH/g or more, and is 30 mgKOH/g or less, more preferably 20 mgKOH/g or less, more preferably 15 mgKOH/g or less, more preferably 10 mgKOH/g or less.
<11> The asphalt composition for road pavement according to any of <1> to <10>, wherein the hydroxy group value of the polyester resin is preferably 10 mgKOH/g or more, more preferably 15 mgKOH/g or more, more preferably 20 mgKOH/g or more, more preferably 25 mgKOH/g or more, and is preferably 50 mgKOH/g or less, more preferably 45 mgKOH/g or less, more preferably 40 mgKOH/g or less.
<12> The asphalt composition for road pavement according to any of <1> to <11>, wherein the softening point of the polyester resin is 90° C. or higher, preferably 95° C. or higher, more preferably 97.5° C. or higher, more preferably 100° C. or higher, and is 125° C. or lower, preferably 120° C. or lower, more preferably 115° C. or lower.
<13> The asphalt composition for road pavement according to any of <1> to <12>, wherein the glass transition point of the polyester resin is 40° C. or higher, preferably 45° C. or higher, more preferably 50° C. or higher, and is 70° C. or lower, preferably 60° C. or lower, more preferably 55° C. or lower.
<14> The asphalt composition for road pavement according to any of <1> to <13>, wherein the number average molecular weight of the polyester resin is 3,000 or more, more preferably 3,500 or more, further preferably 4,000 or more, and is preferably 8,000 or less, more preferably 7,000 or less, and further preferably 5,000 or less.
<15> The asphalt composition for road pavement according to any of <1> to <14>, wherein the proportion of the polyester resin is 2 parts by mass or more based on 100 parts by mass of asphalt, preferably 5 parts by mass or more, more preferably 8 parts by mass or more, more preferably 10 parts by mass or more, more preferably 15 parts by mass or more, and is 30 parts by mass or less, preferably 25 parts by mass or less.
<16> The asphalt composition for road pavement according to any of <1> to <15>, wherein the content of asphalt in the asphalt composition is preferably 2% by mass or more, more preferably 3% by mass or more, and is preferably 15% by mass or less, more preferably 10% by mass or less, more preferably 8% by mass or less.
<17> The asphalt composition for road pavement according to any of <1> to <16>, wherein the content of the aggregate is preferably 1,000 parts by mass or more based on 100 parts by mass of the total of asphalt and the polyester resin, more preferably 1,200 parts by mass or more, more preferably 1,500 parts by mass or more, and is preferably 3,000 parts by mass or less, more preferably 2,500 parts by mass or less, even more preferably 2,000 parts by mass or less.
<18> The asphalt composition for road pavement according to any of <1> to <17>, which is obtained by mixing the asphalt, the polyester resin and the aggregate preferably at a temperature higher than the softening point of the polyester resin, preferably at 140° C. or higher, and preferably at 200° C. or lower, more preferably at 190° C. or lower and further more preferably at 180° C. or lower.
<19> The asphalt composition for road pavement according to <18>, wherein the mixing time is preferably 30 seconds or more, more preferably 1 minute or more, more preferably 2 minutes or more, more preferably 5 minutes or more, and is preferably about 30 minutes or less.
<20> A method for producing an asphalt composition for road pavement, including:
a step of mixing asphalt, a polyester resin, and an aggregate at 130° C. or higher and 200° C. or lower,
wherein the polyester resin is a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid and maleic acid, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, or (ii) a polyester having an alcohol component-derived constituent unit containing 65 mol % or more of an alkylene oxide adduct of bisphenol A and a carboxylic acid component-derived constituent unit containing, in total, 50 mol % or more of one or more selected from the group consisting of fumaric acid, maleic acid, terephthalic acid and isophthalic acid, and having a total amount of fumaric acid and maleic acid of less than 50 mol %, and a total amount of terephthalic acid and isophthalic acid of less than 50 mol %, which has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, and
the ratio of the polyester resin is 2 parts by mass or more and 30 parts by mass or less based on 100 parts by mass of the asphalt.
<21> The method for producing an asphalt composition for road pavement according to <20>, wherein the asphalt is straight asphalt.
<22> The method for producing an asphalt composition for road pavement according to <20> or <21>, wherein the mixing time in the step 1 is preferably 30 seconds or more, more preferably 1 minute or more, more preferably 2 minutes or more, more preferably 5 minutes or more, and is 30 minutes or less.

<23> A road paving method including a step of laying an asphalt composition obtained by the production method as set forth above in any of <20> to <22>, thereby forming an asphalt paving material layer.

EXAMPLES

Values of properties of resins and others were measured and evaluated by the following methods.

[Acid Value and Hydroxy Group Value of Polyester Resin]

An acid value and a hydroxy group value of a polyester resin were measured on the basis of the method of JIS K0070. However, only the measuring solvent was changed from a mixed solvent of ethanol and ether as prescribed in JIS K0070 to a mixed solvent of acetone and toluene (acetone/toluene=1/1 (volume ratio)).

[Softening Point and Glass Transition Point of Polyester Resin]

(1) Softening Point:

Using a flow tester "CFT-500D" (manufactured by Shimadzu Corporation), while heating 1 g of a sample at a temperature rise rate of 6° C./min, a load of 1.96 MPa was applied by a plunger, and the sample was extruded through a nozzle having a diameter of 1 mm and a length of 1 mm. The amount of descent of the plunger of the flow tester versus the temperature was plotted, and a temperature at which a half amount of the sample flowed out was defined as the softening point of the sample.

(2) Maximum Endothermic Peak Temperature:

Using a differential scanning calorimeter "Q-100" (manufactured by TA Instruments Japan Inc.), a sample which had been cooled from room temperature (20° C.) to 0° C. at a temperature drop rate of 10° C./min was kept at that temperature for one minute, and thereafter, the resulting sample was measured while raising the temperature to 180° C. at a temperature rise rate of 10° C./min. Among observed endothermic peaks, a temperature of the peak existent on the highest temperature side was defined as the maximum endothermic peak temperature of the sample.

(3) Glass Transition Point:

Using a differential scanning calorimeter "Q-100" (manufactured by TA Instruments Japan Inc.), 0.01 to 0.02 g of a sample was weighed in an aluminum pan, subjected to temperature rise to 200° C., and then cooled from that temperature to 0° C. at a temperature drop rate of 10° C./min. Subsequently, the resulting sample was measured while raising the temperature to 150° C. at a temperature rise rate of 10° C./min. A temperature at which an extension of a baseline of not higher than the maximum endothermic peak temperature was intersected with a tangential line having a maximum inclination of the curve in a region of from a rise-up portion of the peak to an apex of the peak was read as the glass transition point of the sample.

[Measurement Method of Average Particle Diameter of Polyester Resin Particle]

The average particle diameter of the polyester resin particle was measured in conformity with the sieving method according to JIS Z8815. 100 g of resin particles was sieved with seven sieves having a sieve opening of 2,830 μm, 2,000 μm, 1,400 μm, 850 μm, 600 μM, 425 μm, and 106 μm, respectively by using a Ro-Tap sieve shaker (manufactured by CMT Co., Ltd.), thereby determining the average particle diameter of the polyester resin particles.

[Number Average Molecular Weight and Weight Average Molecular Weight of Resin]

The molecular weight distribution of the resin was measured through gel permeation chromatography (GPC) according to the method mentioned below, and the number average molecular weight Mn and the weight average molecular weight Mw thereof were determined.

(1) Preparation of Sample Solution

A resin was dissolved in chloroform to have a concentration of 0.5 g/100 mL. Next, the solution was filtered through a fluororesin filter "FP-200" (manufactured by Sumitomo Electric Industries, Ltd.) having a pore size of 2 μm to remove insolubles, thereby preparing a sample solution.

(2) Measurement of Molecular Weight

Using the apparatus mentioned below, chloroform as an eluent was made to flow therethrough at a rate of 1 mL/min, and the column was stabilized in a thermostat bath at 40° C. 100 μl of the sample solution was injected thereinto and analyzed. The molecular weight of the sample was calculated based on the calibration curve previously prepared. The calibration curve was formed using a few types of monodispersed polystyrene having a known molecular weight ($2.63 \times 10^3$, $2.06 \times 10^4$, $1.02 \times 10^5$, manufactured by Tosoh Corporation; $2.10 \times 10^3$, $7.00 \times 10^3$, $5.04 \times 10^4$, manufactured by GL Science Inc.) as standard samples. Measuring Apparatus: "CO-8010" (manufactured by Tosoh Corporation) Analysis Column: "$GMH_{XL}$"+"$G3000H_{XL}$" (both manufactured by Tosoh Corporation)

[Solid Content Concentration of Aqueous Dispersion of Polyester Resin Particle]

Using an infrared moisture balance "FD-230" (manufactured by Kett Electric Laboratory), 5 g of a sample was dried at a drying temperature of 150° C. under conditions in a measurement mode 96 (monitoring time: 2.5 minutes, fluctuation range: 0.05%), thereby measuring the water of the sample (% by mass). The solid content concentration was calculated according to the following formula.

Solid content concentration (% by mass)=100−(Water of sample) (% by mass)

[Dry Strength]

Each of molded articles (diameter 101.6 mm, thickness 63 mm) obtained in Examples and Comparative Examples as described later was immersed in water at 25° C. for 2 hours, then dried at room temperature for 24 hours, and analyzed with a Marshall stability tester "LA-160" (manufactured by Sanyo Testing Machines Co., Ltd.) at a drop rate of 5 mm/s.

[Strength after Immersion in Water]

Each of molded articles obtained in Examples and Comparative Examples as described later was immersed in water at 25° C. for 2 hours, dried at room temperature for 24 hours, immersed in water at 60° C. for 2 hours, and then dried. Then, the strength was measured.

[Bending Strength]

<Method for Forming Test Piece>

1800 g of sand heated at 180° C. was put into a planetary mixer "NKA-102" (manufactured by Nikken Corporation, vertical asphalt mixer) heated at 175° C., then 100 g of straight asphalt/polyester resin mixture was put thereinto, and mixed for 270 seconds.

After mixing, 1230 g of the resultant mixture was weighed in a metal vat, stored therein at 175° C. for 30 minutes, then put into a wheel tracking test mold, and formed into a wheel tracking test piece in a size of 30×30×5 cm, using a P-type roller compactor "NKA-105P" (manufactured by Nikken Corporation) (load: linear pressure 29.4 kN/m). Two test samples each in a size of 30×10×5 cm were cut out of the test piece in the right and left horizontal direction from the flat center part thereof, using an asphalt mixture cutter "NA-600" (manufactured by Nakajima Giken Co., Ltd.). The resultant test samples were cooled in a low-temperature thermostat bath (−10° C.) for 6 hours or more, and then the bending strength thereof was measured under the following measurement condition.

<Test Condition>
Measuring Apparatus: Tensile compression universal tester (220x/INTESCO)
Test Piece: width 100 mm, thickness 51 mm, length 300 mm
Test Temperature: −10° C.
Load Speed: 50 mm/min
Inter-fulcrum Distance: 200 mm Production Examples 1 to 3, and 5 to 6 (Polyester Resins a1 to a3, and a5 to a6)

An alcohol component and a carboxylic acid component for a polyester resin, which are shown in Table 1, 20 g of tin(II) di(2-ethylhexanoate), and 2 g of tertiary butyl catechol were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at 108° C. to 205° C. for 8 hours in a mantle heater under a nitrogen atmosphere. Thereafter, the resultant was allowed to react under the reduced-pressure condition at 8 kPa for one hour. There were thus obtained desired polyester resins a1 to a3, and a5 to a6.

Each of the resulting polyester resins was pulverized using a pulverizer "SF-1" (manufactured by Sanriki Seisakusho Co., Ltd.). A resin having a desired particle diameter was obtained by controlling the screen opening and the rotation rate. The results of the average particle diameter are shown in Table 1.

Production Example 4 (Polyester Resin a4)

An alcohol component for a polyester resin, which is shown in Table 1, isophthalic acid, 20 g of tin(II) di(2-ethylhexanoate), and 2 g of gallic acid were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at 235° C. for 4 hours in a mantle heater under a nitrogen atmosphere.

Thereafter, the temperature was lowered to 180° C., and the remaining acid component and 2 g of tertiary butyl catechol were added, heated up to 205° C. taking 8 hours, and then reacted under a reduced-pressure condition at 8 kPa until the resultant product could have a predetermined softening point thereby giving a intended polyester resin a4.

The resulting polyester resin was pulverized using a pulverizer "SF-1" (manufactured by Sanriki Seisakusho Co., Ltd.). A resin having a desired particle diameter was obtained by controlling the screen opening and the rotation rate. The result of the average particle diameter is shown in Table 1.

Production Examples 7 and 8 (Polyester Resins a7 and a8)

An alcohol component for a polyester resin, which is shown in Table 1, terephthalic acid, 20 g of tin(II) di(2-ethylhexanoate), and 2 g of tertiary butyl catechol were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at 230° C. for 8 hours in a mantle heater under a nitrogen atmosphere. Subsequently, this was reacted under a reduced-pressure condition at 8 kPa for 1 hour, and then the temperature was lowered to 160° C., and the remaining acid was added, and heated up to 210° C. taking 4 hours. This was further reacted under a reduced-pressure condition at 8 kPa at 210° C. until the product could have desired thermal properties.

The resulting polyester resin was pulverized using a pulverizer "SF-1" (manufactured by Sanriki Seisakusho Co., Ltd.). A resin having a desired particle diameter was obtained by controlling the screen opening and the rotation rate. The result of the average particle diameter is shown in Table 1.

TABLE 1

| | | | Production Example | | | | | | | |
|---|---|---|---|---|---|---|---|---|---|---|
| | | | 1 | | 2 | | 3 | | 4 | |
| | | | Polyester Resin | | | | | | | |
| | | | a1 | | a2 | | a3 | | a4 | |
| | | | g | mol %*3 | g | mol %*3 | g | mol %*3 | g | mol %*3 |
| Raw Material Monomer | Alcohol Component | BPA-PO *1 | 350 | 5 | 1400 | 20 | 1400 | 20 | 2800 | 40 |
| | | BPA-EO *2 | 5590 | 89 | 5200 | 80 | 5200 | 80 | 3900 | 60 |
| | | Glycerin | 111 | 6 | | | | | | |
| | Carboxylic Acid Component | Fumaric Acid | 1276 | 57 | 2250 | 97 | 2250 | 97 | 1276 | 55 |
| | | Maleic Acid | 928 | 41 | | | | | | |
| | | Terephthalic Acid | | | | | | | | |
| | | Isopthalic Acid | | | | | | | 1328 | 40 |
| | | Trimellitic Anhydride | | | | | | | | |
| Properties | Softening Point (° C.) | | 105.4 | | 109.4 | | 94.5 | | 105.8 | |
| | Acid Value (mgKOH/g) | | 7.6 | | 6.5 | | 26.3 | | 13.5 | |
| | Hydroxy Group Value (mgKOH/g) | | 33.1 | | 17.3 | | 45.9 | | 26.2 | |
| | Glass Transition Point (° C.) | | 51.3 | | 64.3 | | 57.8 | | 65.2 | |
| | Number Average Molecular Weight | | 4200 | | 7200 | | 3300 | | 4700 | |

TABLE 1-continued

| | | | Production Example | | | | | | | |
|---|---|---|---|---|---|---|---|---|---|---|
| | | | 5 | | 6 | | 7 | | 8 | |
| | | | | | | Polyester Resin | | | | |
| | | | a5 | | a6 | | a7 | | a8 | |
| | | | g | mol %*3 | g | mol %*3 | g | mol %*3 | g | mol %*3 |
| Raw Material Monomer | Alcohol Component | BPA-PO *1 | 350 | 5 | 350 | 5 | 1400 | 20 | 1400 | 20 |
| | | BPA-EO *2 | 5590 | 86 | 5590 | 86 | 5200 | 80 | 5200 | 80 |
| | | Glycerin | 111 | 6 | 111 | 6 | | | | |
| | Carboxylic Acid Component | Fumaric Acid | | | 2204 | 95 | 1328 | 40 | 1493 | 55 |
| | | Maleic Acid | 2204 | 95 | | | | | | |
| | | Terephthalic Acid | | | | | 928 | 40 | 474 | 25 |
| | | Isopthalic Acid | | | | | | | | |
| | | Trimellitic Anhydride | | | | | 461 | 12 | 377 | 12 |
| Properties | Softening Point (° C.) | | 106.5 | | 107.3 | | 106.2 | | 107.1 | |
| | Acid Value (mgKOH/g) | | 7.2 | | 8.2 | | 14.5 | | 15.1 | |
| | Hydroxy Group Value (mgKOH/g) | | 32.5 | | 35.4 | | 38.9 | | 39.2 | |
| | Glass Transition Point (° C.) | | 51.1 | | 53.6 | | 59.8 | | 56.2 | |
| | Number Average Molecular Weight | | 4500 | | 4000 | | 3800 | | 3700 | |

*1: BPA-PO: Polyoxypropylene (2.2) adduct of bisphenol A
*2: BPA-EO: Polyoxyethylene (2.2) adduct of bisphenol A
*3: Molar amount (mol %) based on 100 mol of alcohol component Example 1 (Asphalt Composition)

1,800 g of an aggregate having the composition mentioned below and heated at 180° C. was put into a planetary mixer "NKA-102" (manufactured by Nikken Corporation, vertical asphalt mixer) heated at 175° C. Subsequently, 100 g in total of straight asphalt (penetration 53) and a polyester resin were put thereinto, and mixed for 270 seconds.

After mixing, 1,230 g of the resultant mixture was weighed in a metal vat, stored at 175° C. for 30 minutes, then put into the mold of a Marshall stability tester "LA-160" (manufactured by Sanyo Testing Machines Co., Ltd.), and using a Marshall automatic tamper "LA-176" (manufactured by Sanyo Testing Machines Co., Ltd.), this was filled in the mold in a mode of double-face tamping with a 4.5-kg weight dropping from a height of 45 cm for a total of 75 times on one side.

<Composition of Aggregate>
No. 6 crushed stone: 37.0% by mass (material: hard sandstone)
No. 7 crushed stone: 18.5% by mass (material: hard sandstone)
Crushed sand: 29.0% by mass (material: hard sandstone)
Fine sand: 9.5% by mass (material: washed sand)
Stone dust: 6.0% by mass (material: limestone)
Passing % by mass:
Mesh 19 mm: 100% by mass
Mesh 13.2 mm: 99.2% by mass
Mesh 4.75 mm: 61.9% by mass
Mesh 2.36 mm: 42.4% by mass
Mesh 600 μm: 26.3% by mass
Mesh 300 μm 17.9% by mass
Mesh 150 μm: 9.2% by mass
Mesh 75 μm: 5.7% by mass Examples 2 to 10, and Comparative Example 1 (Asphalt Compositions)

Asphalt compositions were prepared in the same manner as in Example 1 except that the formulation was as in Table 2. These were tested in various tests, and the results are shown in Table 2.

TABLE 2

| | Blended Amount of Straight Asphalt (part by mass)*1 | Polyester Resin | | Aggregate (part by mass)*1 | Evaluation | | |
|---|---|---|---|---|---|---|---|
| | | Type of Resin | Amount*1 (part by mass) | | Dry Strength (kN) | Strength after immersion in water (kN) | Bending Strength (MPa) |
| Example 1 | 80 | a1 | 20 | 1800 | 35.2 | 32.5 | 7.9 |
| Example 2 | 80 | a2 | 20 | 1800 | 32.9 | 29.8 | 7.4 |
| Example 3 | 80 | a3 | 20 | 1800 | 26.5 | 21.8 | 7.1 |
| Example 4 | 80 | a4 | 20 | 1800 | 31.6 | 27.2 | 6.8 |
| Example 5 | 80 | a5 | 20 | 1800 | 33.5 | 31.1 | 7.9 |
| Example 6 | 80 | a6 | 20 | 1800 | 31.5 | 30.8 | 7.3 |
| Example 7 | 80 | a7 | 20 | 1800 | 28.2 | 26.1 | 6.5 |
| Example 8 | 80 | a8 | 20 | 1800 | 28.9 | 27.2 | 6.7 |
| Example 9 | 95 | a1 | 5 | 1800 | 24.6 | 18.1 | 7.3 |
| Example 10 | 90 | a1 | 10 | 1800 | 30.2 | 24.9 | 7.5 |
| Comparative Example 1 | 100 | — | — | 1800 | 11.3 | 8.7 | 6.7 |

*1: Amount (part by mass) based on 100 parts by mass of the total of asphalt and polyester resin From the above, it is known that the asphalt compositions of Examples are excellent in dry strength, strength after immersion in water and bending strength as compared with those of Comparative Examples.

The invention claimed is:

1. An asphalt composition for road pavement, comprising:
asphalt;
a polyester resin; and
an aggregate,
wherein the polyester resin is
   (i) a polyester having an alcohol component-derived constituent unit containing 65 mol % or more of an alkylene oxide adduct of bisphenol A and a carboxylic acid component-derived constituent unit containing a total amount of 50 mol % or more of one or more selected from the group consisting of fumaric acid and maleic acid, wherein the polyester (i) has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, or
   (ii) a polyester having an alcohol component-derived constituent unit containing 65 mol % or more of an alkylene oxide adduct of bisphenol A and a carboxylic acid component-derived constituent unit containing a total amount of 50 mol % or more of one or more selected from the group consisting of fumaric acid, maleic acid, terephthalic acid and isophthalic acid, and having a total amount of fumaric acid and maleic acid of less than 50 mol %, and a total amount of terephthalic acid and isophthalic acid of less than 50 mol %, wherein the polyester (ii) has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, and
the amount of the polyester resin is 2 parts by mass or more and 30 parts by mass or less based on 100 parts by mass of the asphalt.

2. The asphalt composition for road pavement according to claim 1, wherein the alkylene oxide adduct of bisphenol A satisfies the relation that the molar ratio of polypropylene oxide adduct of bisphenol A/polyethylene oxide adduct of bisphenol A is 0/100 or more and 50/50 or less.

3. The asphalt composition for road pavement according to claim 1, wherein a proportion of the alcohol component-derived constituent unit and the carboxylic acid component-derived constituent unit in the polyester resin is 95 mol % or more.

4. The asphalt composition for road pavement according to claim 1, which is obtained by mixing the asphalt, the polyester resin and the aggregate at 130° C. or higher and 200° C. or lower.

5. A method for producing an asphalt composition for road pavement, comprising:
a step of mixing asphalt, a polyester resin, and an aggregate at 130° C. or higher and 200° C. or lower,
wherein the polyester resin is
   (i) a polyester having an alcohol component-derived constituent unit containing 65 mol % or more of an alkylene oxide adduct of bisphenol A and a carboxylic acid component-derived constituent unit containing a total amount of 50 mol % or more of one or more selected from the group consisting of fumaric acid and maleic acid, wherein the polyester (i) has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, or
   (ii) a polyester having an alcohol component-derived constituent unit containing 65 mol % or more of an alkylene oxide adduct of bisphenol A and a carboxylic acid component-derived constituent unit containing a total amount of 50 mol % or more of one or more selected from the group consisting of fumaric acid, maleic acid, terephthalic acid and isophthalic acid, and having a total amount of fumaric acid and maleic acid of less than 50 mol %, and a total amount of terephthalic acid and isophthalic acid of less than 50 mol %, wherein the polyester (ii) has a softening point of 90° C. or higher and 125° C. or lower, a glass transition point of 40° C. or higher and 70° C. or lower, a number average molecular weight of 3,000 or more and 8,000 or less, and an acid value of 2 mgKOH/g or more and 30 mgKOH/g or less, and
the amount of the polyester resin is 2 parts by mass or more and 30 parts by mass or less based on 100 parts by mass of the asphalt.

6. The method for producing an asphalt composition for road pavement according to claim 5, wherein the asphalt is straight asphalt.

7. A road paving method comprising a step of laying the asphalt composition obtained by the method as set forth above in claim 5, thereby forming an asphalt paving material layer.

* * * * *